(12) United States Patent
McGrady et al.

(10) Patent No.: US 6,995,098 B2
(45) Date of Patent: Feb. 7, 2006

(54) WALLBOARD CONTAINING SCRIM AND MATT

(75) Inventors: Michael J McGrady, Gastonia, NC (US); Craig C. Robertson, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 10/249,507

(22) Filed: Apr. 15, 2003

(65) Prior Publication Data

US 2004/0209060 A1 Oct. 21, 2004

(51) Int. Cl.
*B32B 5/26* (2006.01)
*B32B 27/12* (2006.01)

(52) U.S. Cl. ............... 442/35; 442/2; 442/20; 442/24; 442/26; 442/29; 442/32; 442/42; 442/43; 442/44; 442/45; 442/172; 442/173; 442/180; 428/121; 428/192; 428/220

(58) Field of Classification Search ............ 442/20, 442/24, 26, 32, 35, 42, 43, 45, 48, 2, 29, 442/44, 172, 173, 180, 52; 428/121, 192, 428/220
See application file for complete search history.

(56) References Cited

U.S. PATENT DOCUMENTS

| 3,312,585 | A |   | 4/1967  | Hamme |
| 3,993,822 | A |   | 11/1976 | Knauf et al. |
| 4,298,413 | A |   | 11/1981 | Teare |
| 4,617,219 | A | * | 10/1986 | Schupack ............ 428/113 |
| 4,647,496 | A |   | 3/1987  | Lehnert et al. |
| 4,948,647 | A |   | 8/1990  | Burkard |
| 5,030,502 | A |   | 7/1991  | Teare |
| 5,221,386 | A |   | 6/1993  | Ensminger et al. |
| 6,054,205 | A |   | 4/2000  | Newman et al. |
| 6,187,409 | B1 | * | 2/2001 | Mathieu ............... 428/70 |
| 6,316,087 | B1 |   | 11/2001 | Lehan |
| 6,368,024 | B2 |   | 4/2002  | Kittson |
| 6,391,131 | B1 |   | 5/2002  | Newman et al. |
| 6,406,779 | B1 |   | 6/2002  | Carbo et al. |
| 2002/0151240 | A1 | * | 10/2002 | Smith et al. ......... 442/327 |

OTHER PUBLICATIONS

Sabit Adanur, Wellington Sears Handbook of Industrial Textiles, 1995, Technomic Publishing Company, p. 563.*
"PermaBase Brand Cement Board Construction Guide;" National Gypsum ; 09305/NGC; Buyline 1854; printed from National Gypsum website on Apr. 8, 2003.

* cited by examiner

Primary Examiner—Ula Ruddock
(74) Attorney, Agent, or Firm—Ice Miller

(57) ABSTRACT

Cement wallboards and methods for their preparation are disclosed. The wallboards comprise two scrim layers and one mat layer. The wallboards have a smooth surface, are strong, lightweight, and easy to score and snap. Tiles can be readily adhered to the boards. The wallboards can be used in general commercial and residential construction, and are particularly attractive for use in high water/moisture areas such as bathrooms and shower enclosures.

17 Claims, 2 Drawing Sheets

WALLBOARD CONTAINING SCRIM AND MATT

BACKGROUND OF INVENTION

1. Field of the Invention

The invention relates to a cement wallboard and, more specifically, to a lightweight cement wallboard having a smooth surface suitable for adhesion of tile to the board.

2. Description of the Related Art

Cementitious panels have long been used in commercial and residential construction projects. The boards are commonly screwed or nailed into a wall frame. Wallboards can be used in generally dry conditions without significant modification. The use of wallboards in wet or humid areas such as bathrooms or shower rooms present special challenges. The wallboards must be resistant or impervious to heat and moisture, and preferably can be used as a substrate for ceramic tiles.

Conventional gypsum wallboard panels are made from a wet slurry of calcium sulfate dihydrate ("gypsum") sandwiched between two layers of paper. The slurry is allowed to set, affording a rigid wallboard. The wallboards are typically cut and dried in commercial ovens prior to packaging for sale or use.

Various designs of wallboards have been proposed to address the weight, strength, appearance, preparation price, or industrial applicability of the boards.

U.S. Pat. No. 3,312,585 suggests a gypsum wallboard containing a set gypsum core, paper enclosures, and a water impervious film adhered to the paper. The wallboard is suggested as being especially useful in bathtub enclosures, shower stalls, and other environments frequently contacted by water. The paper completely encloses the gypsum core. Organic synthetic polymeric thermoplastics (e.g. polyvinyl chloride) are preferred to prepare the adhered film.

U.S. Pat. No. 3,993,822 presents a multi-layer gypsum board containing a mixture of gypsum, water, and fibers. A composite coating of a fiberglass layer and a layer of fiberglass fleece is embedded into one face of the board. The opposing face can have a similar coating, or a pasteboard.

U.S. Pat. No. 4,298,413 suggests a process and apparatus for producing fabric-reinforced thin concrete panels. The components are deposited on a web of disposable carrier material such as polyethylene coated paper while moving on a conveyor belt. The produced concrete panels contain the disposable carrier material, a web of reinforcing fabric, a layer of cement, a core mix, a second web of reinforcing fabric, and a second layer of cement.

U.S. Pat. No. 4,617,219 offers a reinforced concrete structure containing a nonwoven fabric reinforcing material encapsulated in cement. The fabric extends throughout the whole structure, or multiple fabric layers can be used in a sandwich or composite type structure. The fabric can also contain a woven or nonwoven scrim to improve the strength of the structure.

U.S. Pat. No. 4,647,496 presents a water resistant fibrous mat-faced gypsum board. A gypsum core is sandwiched between two sheets of porous glass mat. The gypsum core can contain one or more additives to improve the water resistance of the board.

U.S. Pat. No. 4,948,647 describes a backer board to which ceramic tile can be bonded in a bathroom or shower area. The board is made by forming a gypsum core board with fiber glass laminated composite facings, which include an inner fiber glass scrim, an outer fiber glass nonwoven matte, and an acrylic film. The film is made of an acrylic latex.

U.S. Pat. No. 5,030,502 suggests a concrete construction panel having a layer of reinforcing mesh bonded to each face. The mesh is wrapped around the edge of the panel.

U.S. Pat. No. 5,221,386 suggests a cement board having a woven mesh of reinforcing fibers underlying the top, bottom, and longitudinal edge surfaces. The board is produced continuously on a conveyor belt.

U.S. Pat. No. 6,054,205 describes a glass fiber facing sheet comprising an open mesh glass scrim for use in cement boards. The facing sheet can be used on one or both faces of a cement board.

U.S. Pat. No. 6,187,409 B1 suggests a cement panel with reinforced edges. The longitudinal edges are reinforced with a network of fibers. The panels are relatively strong and hard, and allow nails or screws to be driven without the drilling of pilot holes.

U.S. Pat. No. 6,316,087 B1 describes a structural panel containing cement, vermiculite, and fibers. The fibers are used within the core of the panel to enhance lateral and surface integrity. The surface of the panel is coated with foil.

U.S. Pat. No. 6,368,024 B2 describes a geotextile fabric for use in reinforcing earthen retaining walls and related structures. The fabric inhibits soil movement in a direction perpendicular to the face of the structure.

U.S. Pat. No. 6,391,131 B1 offers a glass fiber facing sheet for cement boards that reduces the pitting associated with open mesh glass scrims. The facing sheet can be incorporated into a smooth cement board. A cement slurry is deposited onto a first glass fiber facing sheet, then a second glass fiber facing sheet is applied. A low viscosity cement slurry can be applied onto the surface of the second facing sheet.

U.S. Pat. No. 6,406,779 B1 describes a paperless gypsum/fiber board with at least one surface containing fully hydrated gypsum and reinforcing fiber. The surface is coated with a primer containing an aqueous emulsion of a film-forming polymeric material.

While the prior art discloses various improvements to boards, the need for a strong, lightweight, smooth, and easily scored/snapped board has not yet been met.

SUMMARY OF INVENTION

Cement wallboards containing a mat and two scrim layers are disclosed. The scrim pore size is such that it allows cement penetration and bonding to the mat. The produced wallboards have a smooth surface, are strong, lightweight, and easy to score and snap.

BRIEF DESCRIPTION OF DRAWINGS

The following figures form part of the present specification and are included to further demonstrate certain aspects of the present invention. The invention may be better understood by reference to one or more of these figures in combination with the detailed description of specific embodiments presented herein.

DETAILED DESCRIPTION

Figure 1:
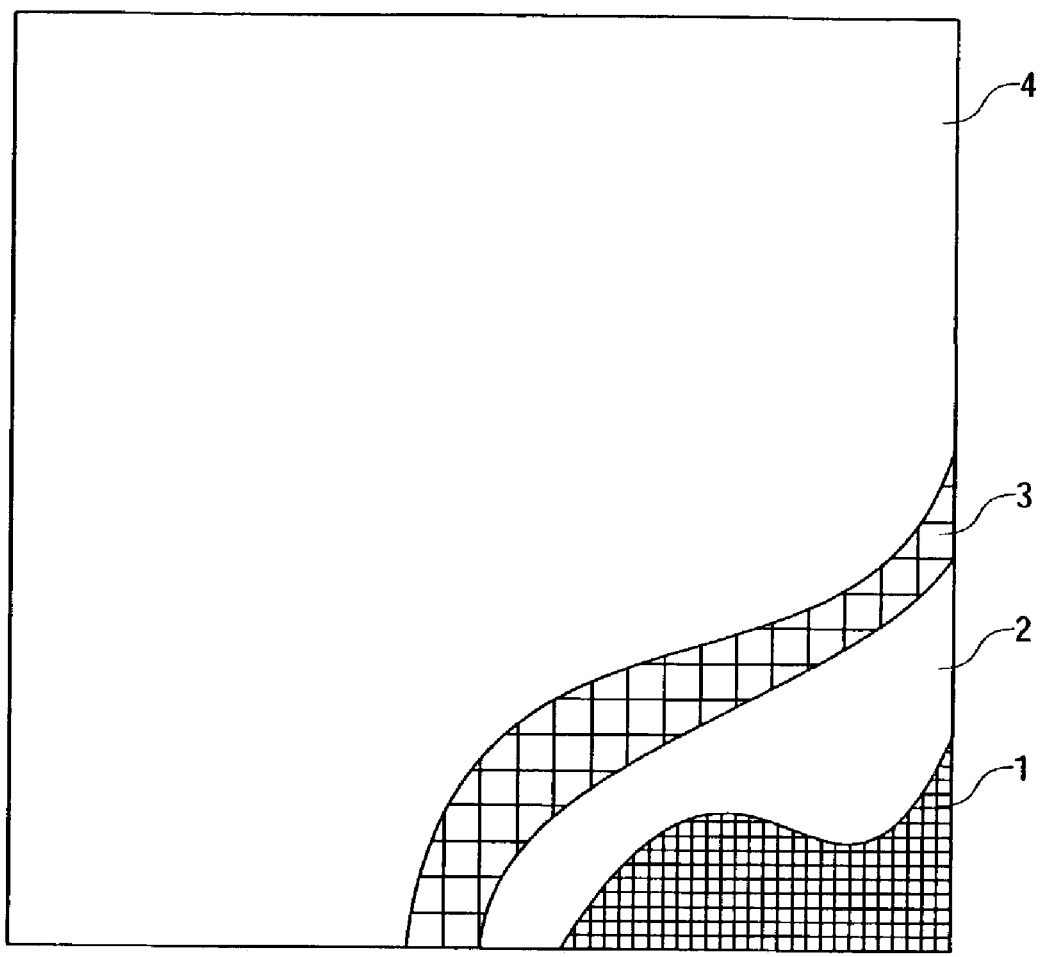
FIG. 1 illustrates a top layer view of an inventive wallboard.
Figure 2:
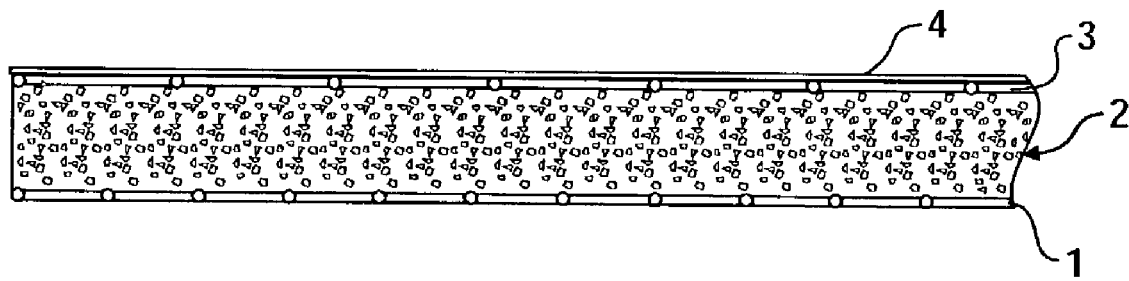
FIG. 2 illustrates a cross-sectional view of an inventive wallboard.

The invention is directed towards cement wallboards, and methods for their preparation. The wallboards of the instant invention are useful in residential and commercial construction. The wallboards are particularly useful for use in areas of high humidity such as bathrooms, kitchens, saunas, and showers. Tiles can be readily adhered to the exterior surface of the wallboards of the instant invention.

Wallboards

One embodiment of the invention is directed towards a wallboard having a cement core. The wallboard preferably comprises a first scrim sheet 1, a cement core layer 2 facially contacting the first scrim sheet, a second scrim sheet 3 facially contacting the cement core layer on the opposite face of the cement core layer from the first scrim sheet, and a mat 4 facially contacting the second scrim sheet.

The first scrim sheet can generally be made of any commercially acceptable material. Such materials include PVC coated fiberglass, basalt fibers, and alkali resistant glass. The mesh size can generally be any mesh size. Mesh sizes are typically measured by yarns per square inch, and are given as a number×number value. The first scrim sheet can be 8×8, 7.5×7.5, 10×8, or 5×5. Smaller numbers of yarns per square inch correspond to larger mesh sizes, and larger openings in the mesh. It is presently preferred that the first scrim sheet be a 8×8 PVC coated fiberglass scrim. Scrim sheets are commercially available from a number of suppliers such as St. Gobain Technical Fabrics (Albion, N.Y.), Fab-Tech (Colchester, Vt.), and Phifer Wire Products (Tuscaloosa, Ala.).

The cement core comprises generally any type of Portland based cement. The core can further comprise lower density particles 2a such as expanded polystyrene, expanded clay, FILLITE (a registered trademark of Trelleborg Fillite Inc., Norcross, Ga.), ceramic microspheres, or glass bubbles. The particles reduce the overall density of the core. Once the wallboard is prepared, it can be heated to partially or fully remove any water present in the core. It is presently preferred that the core comprise polystyrene C-beads from Nova Chemicals (Pittsburgh, Pa.) having an unexpanded particle size of 0.4–0.8 mm and a density of 1 pound per square foot. Expanded polystyrene beads are also available from Huntsman Chemicals (Houston, Tex.) and from BASF (Ludwigshafen, Germany).

The second scrim sheet can be prepared from the same or different materials as was the first scrim sheet. The mesh size of the second scrim sheet can be the same or different from that of the first scrim sheet. It is presently preferred that the second scrim sheet be a 5×5 mesh to allow more cement penetration through the scrim to bond to the mat.

The mat can generally be made of any commercially acceptable material. The mat is typically made of a polymer (e.g. a homopolymer, a co-polymer, or a mixture of polymers). It is presently preferred that the mat be polyester. The mat can generally be about a 10 pound/ft$^2$ mat to about a 40 pound/ft$^2$ mat. Specific examples include about a 14 pound/ft$^2$ mat, about a 20 pound/ft$^2$ mat, and about a 39 pound/ft$^2$ mat. A polyester mat suitable for use in the present invention is commercially available from a number of suppliers such as Lydall Manning (Manchester, Conn.) and ELK Corporation (Dallas, Tex.). The thickness of the mat can generally be any thickness. For example, the thickness can be about 0.1 mm, about 0.25 mm, about 0.5 mm, about 0.75 mm, about 1 mm, about 2 mm, about 3 mm, about 4 mm, or about 5 mm. Polyester mats are also commonly characterized in ounce per square yard. For example, a mat can have about 0.8 ounce per square yard to about 5 ounces per square yard. Specific examples include about 1, about 2, about 3, about 4, and about 5 ounces per square yard.

The overall thickness of the wallboard can generally be any thickness commonly used in the construction industry. Generally, the wallboard can be about ¼ inch (0.64 cm) or greater in thickness. For example, the wallboard can have a thickness of about ¼ inch (0.64 cm), about 5⁄16 inch (0.79 cm), about ½ inch (1.27 cm), about ¾ inch (1.90 cm), or about 1 inch (2.54 cm).

The width of the wallboard can generally be any width commonly used in the construction industry. For example, the width can be about 32 inches (81 cm), about 36 inches (91 cm), or about 48 inches (122 cm).

The length of the wallboard can generally be any length commonly used in the construction industry. For example, the length can be about 48 inches (122 cm), about 60 inches (152 cm), about 72 inches (183 cm), or about 96 inches (244 cm).

The wallboard can further comprise a second mat 5 facially contacting the first scrim sheet. The second mat can be the same or different from the first mat. The wallboard can further comprise one or more U-shaped mats 6 wrapping the edges of the wallboard. The wallboard can comprise two U-shaped mats, one on each side of the wallboard.

The flexural strength of the wallboard is preferably at least about 750 psi (53 kg/cm$^2$). Examples of flexural strengths include at least about 800 psi (56 kg/cm$^2$), at least about 900 psi (63 kg/cm$^2$), at least about 1000 psi (70 kg/cm$^2$), at least about 1100 psi (77 kg/cm$^2$), at least about 1200 psi (84 kg/cm$^2$), at least about 1300 psi (91 kg/cm$^2$), at least about 1400 psi (98 kg/cm$^2$), at least about 1500 psi (105 kg/cm$^2$), and at least about 1600 psi (112 kg/cm$^2$), and ranges between any two of these values.

The compression indentation strength of the wallboard is preferably at least about 1250 psi (88 kg/cm$^2$) measured at a 0.05 inch (0.13 cm) displacement. Examples of compression indentation strength include at least about 1300 psi (kg/cm$^2$), at least about 1400 psi (98 kg/cm$^2$), at least about 1500 psi (105 kg/cm$^2$), at least about 1600 psi (112 kg/cm$^2$), and at least about 1700 psi (120 kg/cm$^2$), and ranges between any two of these values.

Methods of Preparation

The above described wallboards can be prepared by several different methods.

A first method comprises obtaining a first scrim layer, depositing a cement core layer on the first scrim sheet, contacting the cement core layer with a second scrim sheet, and contacting a mat with the second scrim sheet. The cement core layer comprises a first face and second face. The first scrim sheet facially contacts the first face of the cement core layer, and the second scrim sheet facially contacts the second face of the cement core layer. The mat facially contacts the second scrim sheet on the opposite side from the cement core layer.

A second method comprises obtaining a mat, contacting the mat with a second scrim sheet, depositing a cement core layer on the second scrim sheet, and contacting a first scrim sheet with the cement core layer. The cement core layer comprises a first face and second face. The first scrim sheet facially contacts the first face of the cement core layer, and the second scrim sheet facially contacts the second face of the cement core layer. The mat facially contacts the second scrim sheet on the opposite side from the cement core layer.

Methods of preparing the above described wallboards can further comprise heating the wallboards after assembly to remove water. The methods can further comprise wrapping one or two edges with an edge mat. The methods can further comprise adding one or more low density materials to the cement core layer material prior to or concurrently with the depositing step.

The methods can be performed in a batchwise manner or in a continuous manner. The methods can further comprise cutting the wallboard into any desired shape. The cutting step can be performed prior to or after the heating step.

Methods of Use

The above described wallboards can be used in a variety of commercial and residential applications. For example, the wallboards can be used as backerboards for tiles. The wallboards can be used in shower enclosures, tub surrounds, garden tubs, interior and exterior countertops, swimming pool decks, whirlpool decks, exterior soffit panels, floor underlayment, exterior sheathing panels, and other residential and commercial construction environments.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of Wallboard

Figure 3:
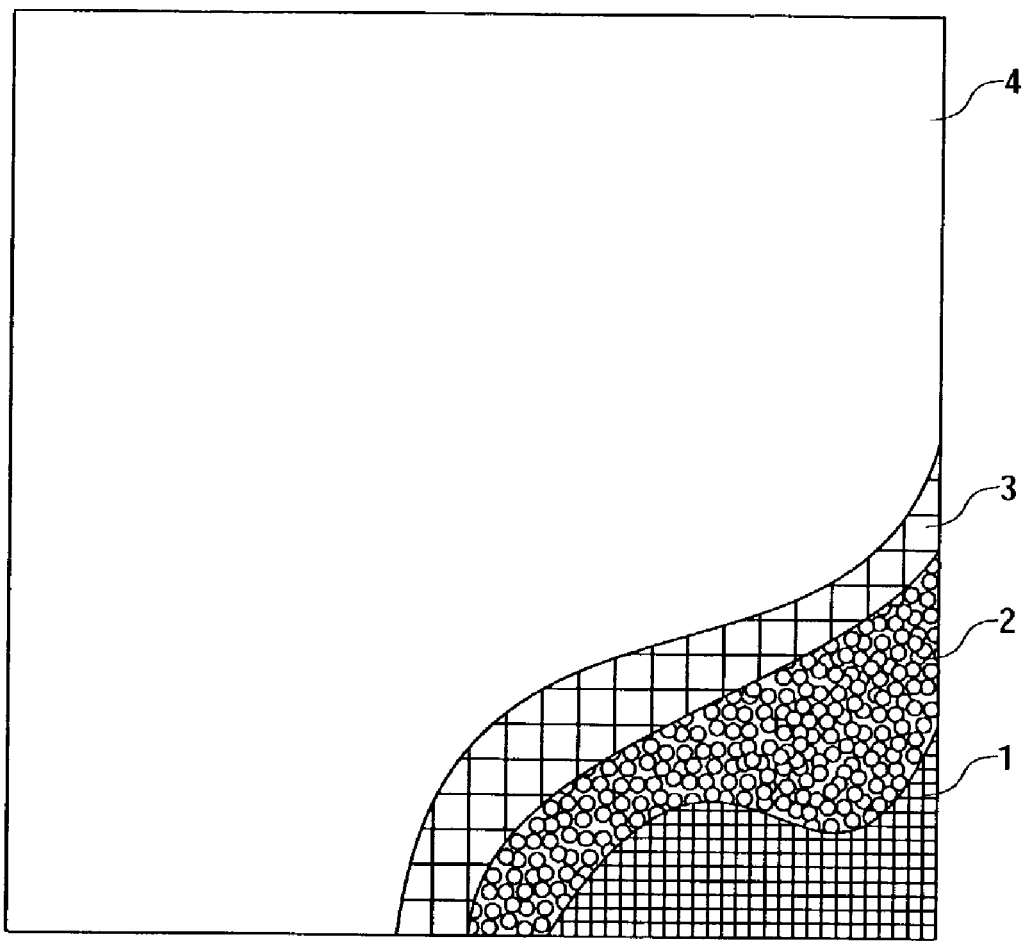
FIG. 3 illustrates a top layer view of an inventive wallboard having a cement core layer containing lower density particles.
Figure 4:
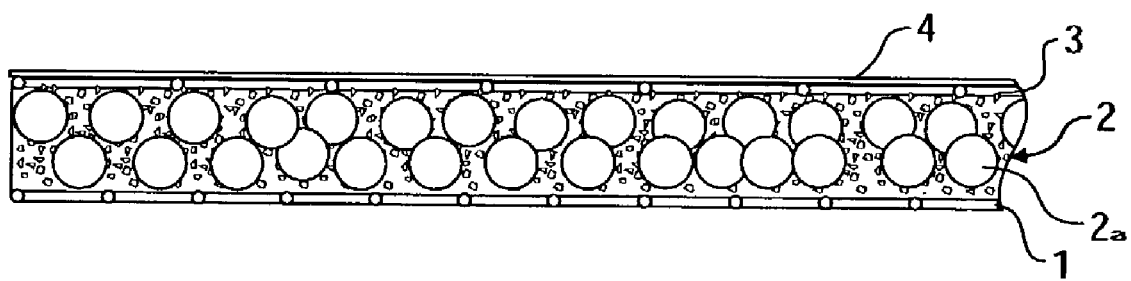
FIG. 4 illustrates a cross-sectional view of an inventive wallboard having a cement core layer containing lower density particles.

A wallboard was produced as shown in FIG. 3. The board contained a 1 ounce 20 pound polyester mat, a 5×5 G75 scrim, a Portland cement core containing expanded polystyrene C-beads (Novachemical), and an 8×8 G75 scrim.

Example 2

Wallboard Measurements

The wallboard of Example 1 was examined. A board of 11 13/16 inches (30.0 cm) length and 11 3/4 inches (29.8 cm) width had a weight of 2.013 pounds (0.91 kg). The average caliper measurement was 0.290 inches (0.74 cm). The density was 84.6 pounds per cubic foot (1355 kg/m$^3$), and the weight/MSF was 1.9654.

Example 3

Flexural Strength Measurements

Wallboards of Example 1 were prepared using three different mat weights: 14.5 pounds per square foot, 20 pounds per square foot, and 39 pounds per square foot. Dried samples were tested for their flexural strength (MOR) using the ASTM C-947 3 point load standard. The results obtained are shown in the following table. MD refers to machine direction, while XMD refers to cross machine direction.

| Mat | MD | XMD | Caliper (inch) | Displacement (inch) | MOR (psi) |
|---|---|---|---|---|---|
| 14.5 | X | | 0.270 (0.686 cm) | 0.803 (2.04 cm) | 1294.5 (91 kg/cm$^2$) |
| 14.5 | | X | 0.272 (0.691 cm) | 0.804 (2.04 cm) | 1534.0 (108 kg/cm$^2$) |
| 20 | X | | 0.269 (0.683 cm) | 0.803 (2.04 cm) | 1333.7 (94 kg/cm$^2$) |
| 20 | | X | 0.276 (0.701 cm) | 0.803 (2.04 cm) | 1480.1 (104 kg/cm$^2$) |
| 39 | X | | 0.274 (0.696 cm) | 0.803 (2.04 cm) | 1311.0 (92 kg/cm$^2$) |
| 39 | | X | 0.274 (0.696 cm) | 0.804 (2.04 cm) | 1603.6 (113 kg/cm$^2$) |

A MOR value of 750 psi (53 kg/cm$^2$) is required for a commercial wallboard product. All values obtained were significantly higher than this threshold.

Example 4

Compression Indentation Strength Measurements

The dried wallboards of Example 3 were tested for their compression indentation strength using the ASTM D-2394 using 1 inch (2.54 cm) diameter discs. The results obtained are shown in the following table.

| Mat | Strength (psi) |
|---|---|
| 14.5 | 1497.9 (105 kg/cm$^2$) |
| 20 | 1730.2 (122 kg/cm$^2$) |
| 39 | 1617.3 (114 kg/cm$^2$) |

The ANSI requirements for a commercial product is a minimum of 1250 psi (88 kg/cm$^2$) at 0.05 inch displacement. All three samples tested exceed this requirement.

Example 5

Comparison with PermaBase[R] Board

PermaBase[R] Portland cement boards are commercially available from National Gypsum Company (Charlotte, N.C.). Details of the product are provided in the Construction Guide and Approval (July 2001). The boards contain fiberglass reinforcing mesh on the front and back faces, and have EdgeTech wrapping on the edges. The following table lists the physical properties of the 1/2 inch (1.27 cm) and 5/16 (0.79 cm) inch thick product.

| Property | 1/2 inch (1.27 cm) | 5/16 inch (0.79 cm) |
|---|---|---|
| Weight (pounds per ft$^2$) | 3 (1.4 kg) | 2 (0.9 kg) |
| Flexural strength (psi) | 750 (53 kg/cm$^2$) | 1250 (88 kg/cm$^2$) |
| Compressive strength (psi) | 2250 (158 kg/cm$^2$) | 2250 (158 kg/cm$^2$) |

The wallboard compositions disclosed herein have a lighter weight and higher flexural strength than the Perma- Base® commercial product. The compressive strength is lower than that of the commercial product, but still well above the ANSI minimum requirement.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

The invention claimed is:

1. A cement wallboard comprising:
   a first scrim sheet;
   a cement core layer having a first face and an opposite second face, wherein the first face facially contacts the first scrim sheet;
   a second scrim sheet facially contacting the second face of the cement core layer; and
   a mat facially contacting the second scrim sheet, wherein the mat is about a 10 pound/ft$^2$ mat to about a 40 pound/ft$^2$ mat.

2. The wallboard of claim 1, wherein the first scrim sheet is made of PVC coated fiberglass, basalt fiber, or alkali resistant glass.

3. The wallboard of claim 1, wherein the first scrim sheet is made of PVC coated fiberglass.

4. The wallboard of claim 1, wherein the first scrim sheet is an 8×8 yds/inch scrim.

5. The wallboard of claim 1, wherein the second scrim sheet is made of PVC coated fiberglass, basalt fiber, or alkali resistant glass.

6. The wallboard of claim 1, wherein the second scrim sheet is made of PVC coated fiberglass.

7. The wallboard of claim 1, wherein the second scrim sheet is a 5×5 yds/inch scrim.

8. The wallboard of claim 1, wherein the cement core layer comprises Portland cement.

9. The wallboard of claim 1, wherein the cement core layer further comprises expanded polystyrene, expanded clay, fillite, ceramic microspheres, or glass bubbles.

10. The wallboard of claim 1, wherein the mat is a polyester mat.

11. The wallboard of claim 1, wherein the mat is about a 14 pound/ft$^2$ mat, about a 20 pound/ft$^2$ mat, or about a 39 pound/ft$^2$ mat.

12. The wallboard of claim 1, having an overall thickness of about ¼ inch, about 5/16 inch, about ½ inch, about ¾ inch, or about 1 inch.

13. The wallboard of claim 1, having a width of about 32 inches, about 36 inches, or about 48 inches.

14. The wallboard of claim 1, having a length of about 48 inches, about 60 inches, about 72 inches, or about 96 inches.

15. The wallboard of claim 1, further comprising a second mat facially contacting the first scrim sheet.

16. The wallboard of claim 1, further comprising a U-shaped mat wrapping an edge of the wallboard.

17. The wallboard of claim 1, further comprising two U-shaped mats wrapping the edges of the wallboard.

* * * * *